(12) United States Patent
Suzuki

(10) Patent No.: US 10,077,035 B2
(45) Date of Patent: Sep. 18, 2018

(54) NEGATIVE PRESSURE-TYPE BOOSTER DEVICE

(71) Applicant: ADVICS CO., LTD., Kariya-shi, Aichi (JP)

(72) Inventor: Kimiyasu Suzuki, Gamagori (JP)

(73) Assignee: ADVICS CO., LTD., Kariya-Shi, Aichi-Ken (JP)

(*) Notice: Subject to any disclaimer, the term of this patent is extended or adjusted under 35 U.S.C. 154(b) by 154 days.

(21) Appl. No.: 15/305,449

(22) PCT Filed: May 29, 2015

(86) PCT No.: PCT/JP2015/065495
§ 371 (c)(1),
(2) Date: Oct. 20, 2016

(87) PCT Pub. No.: WO2015/182733
PCT Pub. Date: Dec. 3, 2015

(65) Prior Publication Data
US 2017/0036657 A1 Feb. 9, 2017

(30) Foreign Application Priority Data
May 30, 2014 (JP) ................. 2014-112782

(51) Int. Cl.
*B60T 13/567* (2006.01)
*B60T 13/56* (2006.01)

(52) U.S. Cl.
CPC ........... *B60T 13/567* (2013.01); *B60T 13/56* (2013.01)

(58) Field of Classification Search
CPC ................ B60T 13/567; B60T 13/56
See application file for complete search history.

(56) References Cited

U.S. PATENT DOCUMENTS 4,394,833 A * 7/1983 Weiler ............... B60T 13/569
60/547.1
5,323,689 A * 6/1994 Yared ................ B60T 13/563
91/376 R

FOREIGN PATENT DOCUMENTS

| JP | 56-163953 A | 12/1981 |
| JP | 6-42503 U | 6/1994 |
| JP | 2007-76437 A | 3/2007 |

OTHER PUBLICATIONS

International Search Report (PCT/ISA/210) dated Jun. 23, 2015, by the Japanese Patent Office as the International Searching Authority for International Application No. PCT/JP2015/065495.

(Continued)

*Primary Examiner* — Thomas E Lazo
(74) *Attorney, Agent, or Firm* — Buchanan Ingersoll & Rooney PC

(57) ABSTRACT

The present invention addresses the problem of standardizing a front shell of a booster shell of a negative pressure-type booster device by modifying the shape of a reinforcement rib provided to the front shell so as to satisfy the demand for varying the installation pitch and installation angle of tie-rod holes with one and the same front shell. A front shell configuring a booster shell of a negative pressure-type booster device in combination with a rear shell includes a reinforcement rib formed by bending the shells, wherein the reinforcement rib is formed along a virtual ellipse of which the center is located at the center of the front shell, with the major axes of the ellipse disposed on a line connecting the centers of two tie-rod holes provided in the front shell.

6 Claims, 5 Drawing Sheets

(56) References Cited

OTHER PUBLICATIONS

Written Opinion (PCT/ISA/237) dated Jun. 23, 2015, by the Japanese Patent Office as the International Searching Authority for International Application No. PCT/JP2015/065495.

\* cited by examiner

[Fig.1]
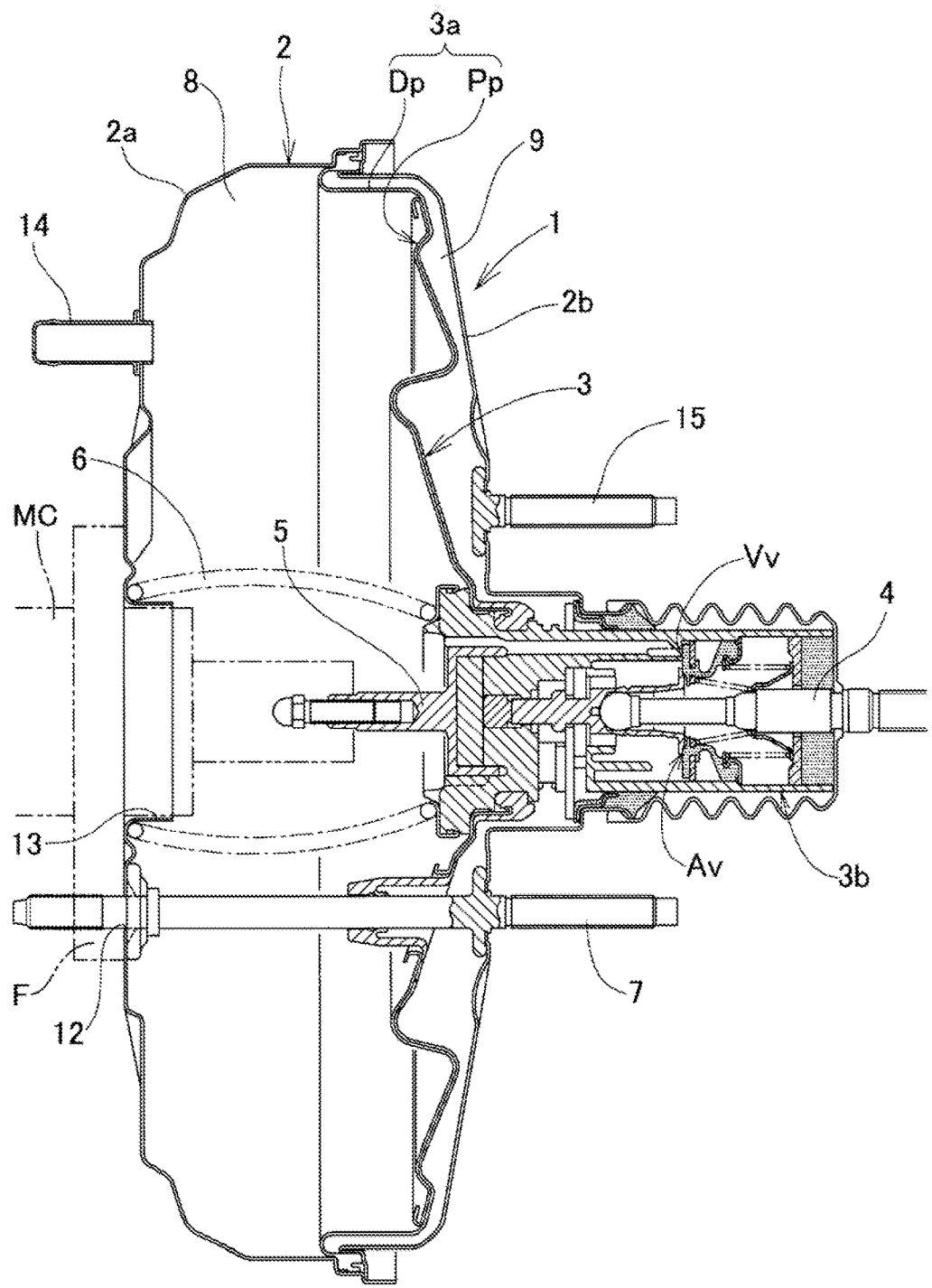

[Fig.2]
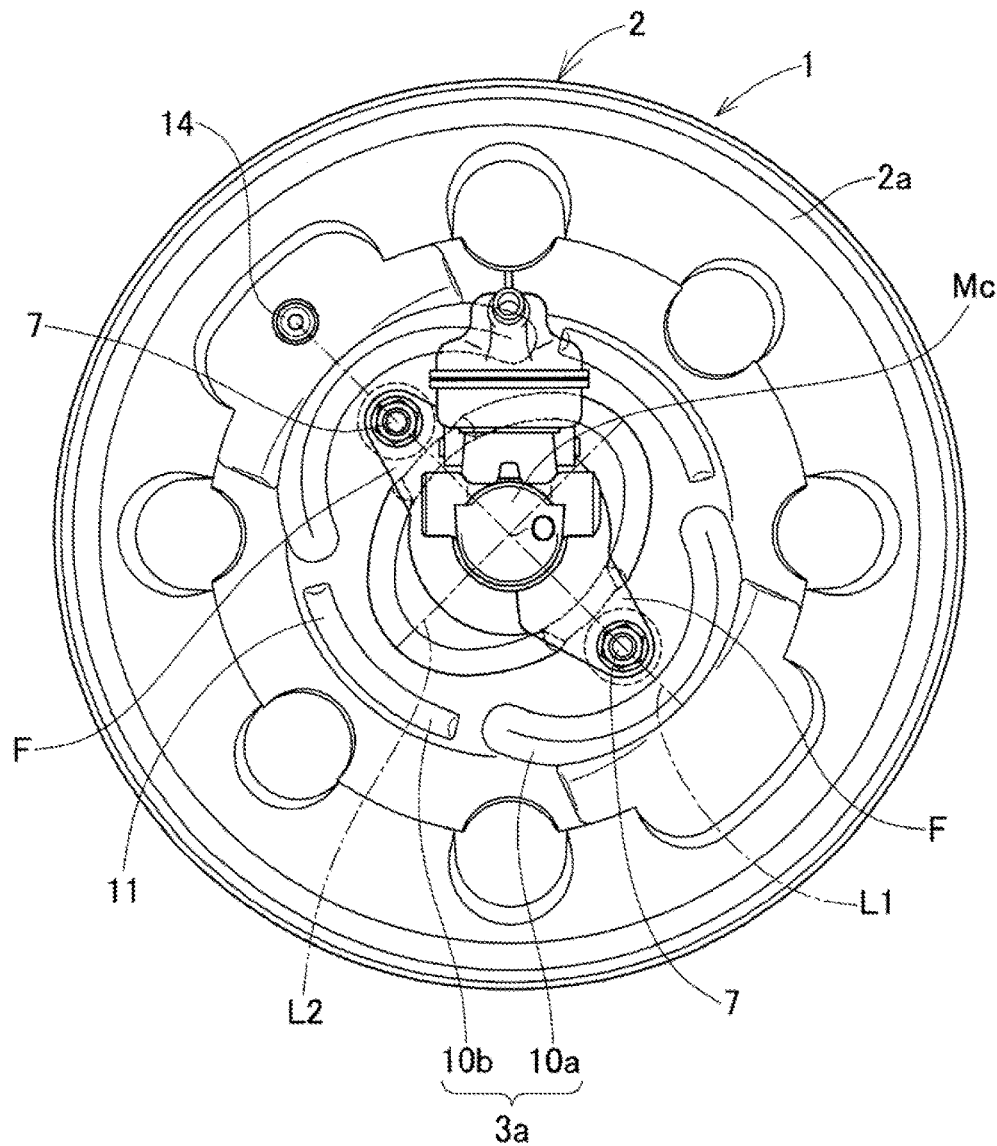

[Fig.3]
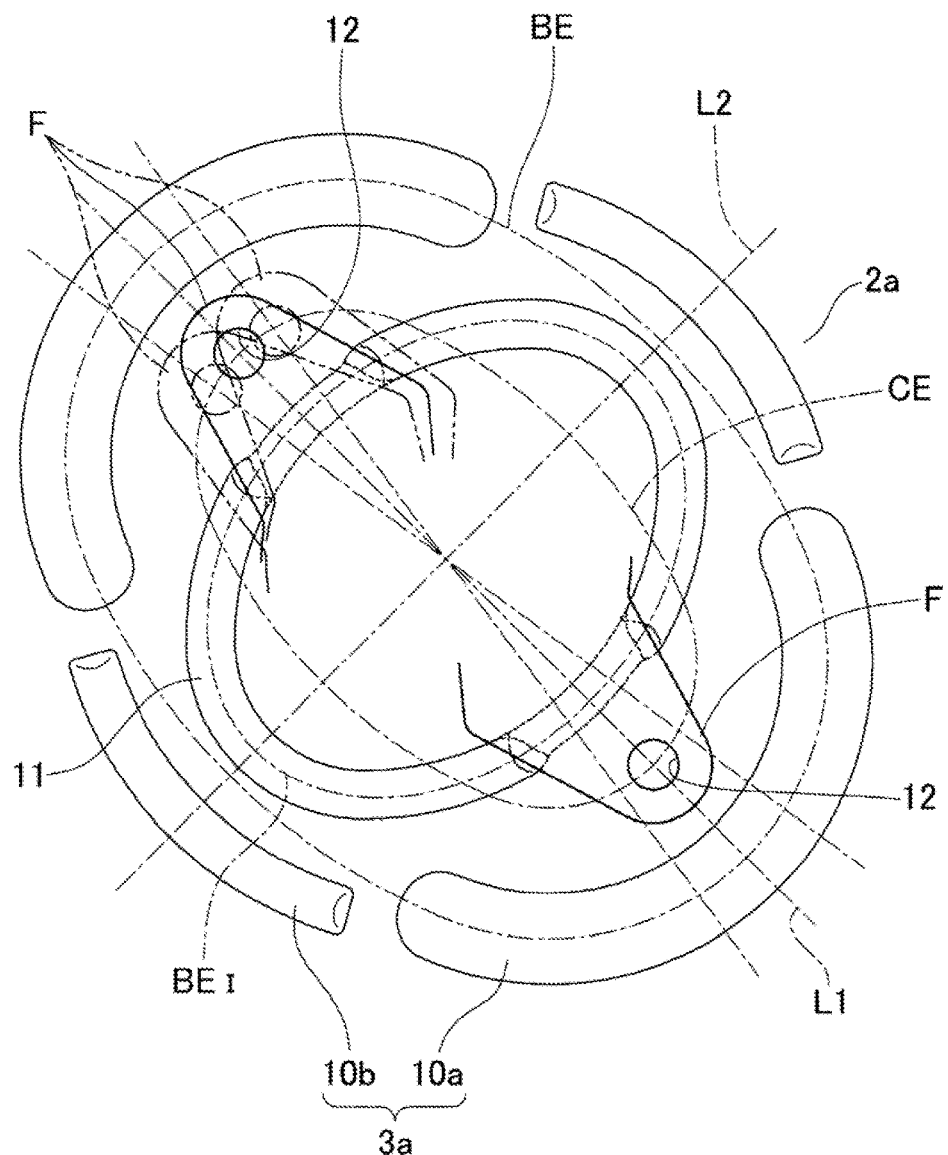

[Fig.4]
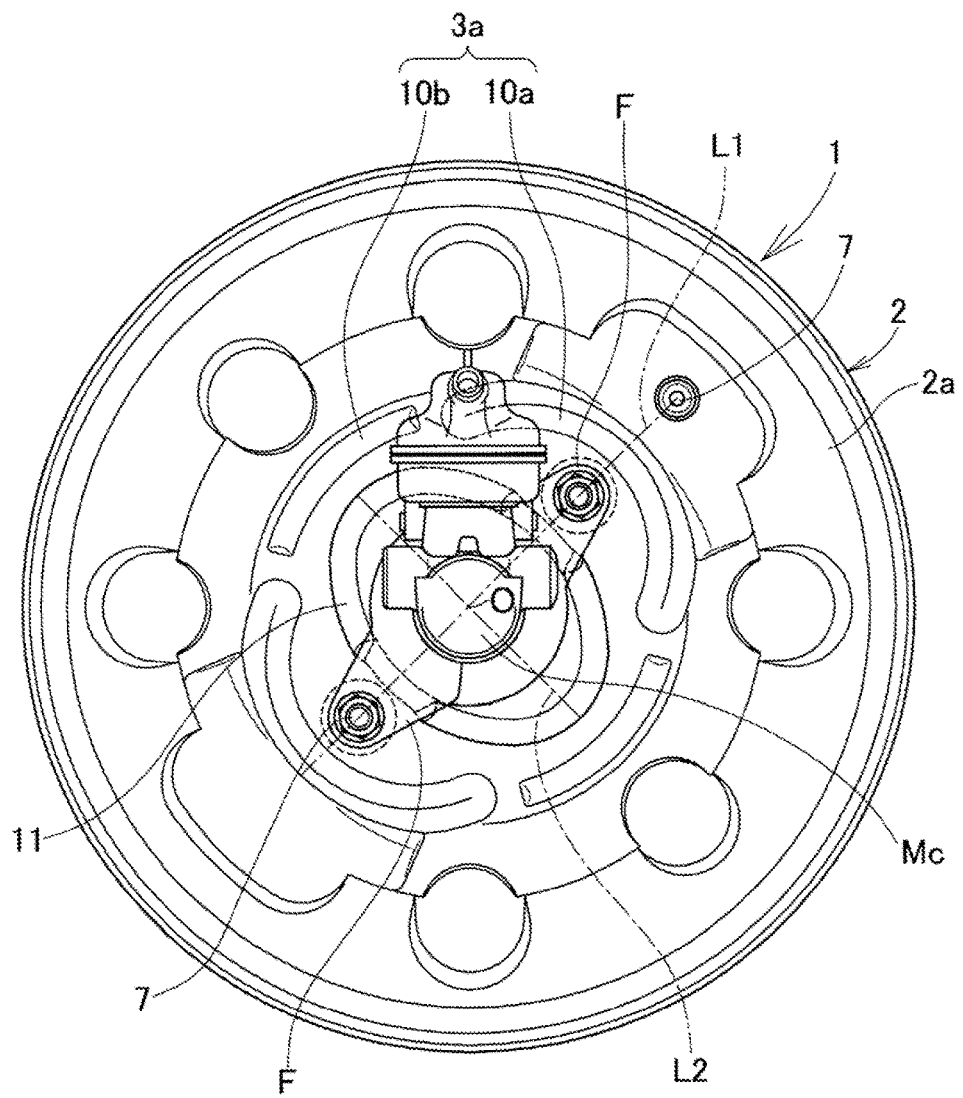

[Fig.5]
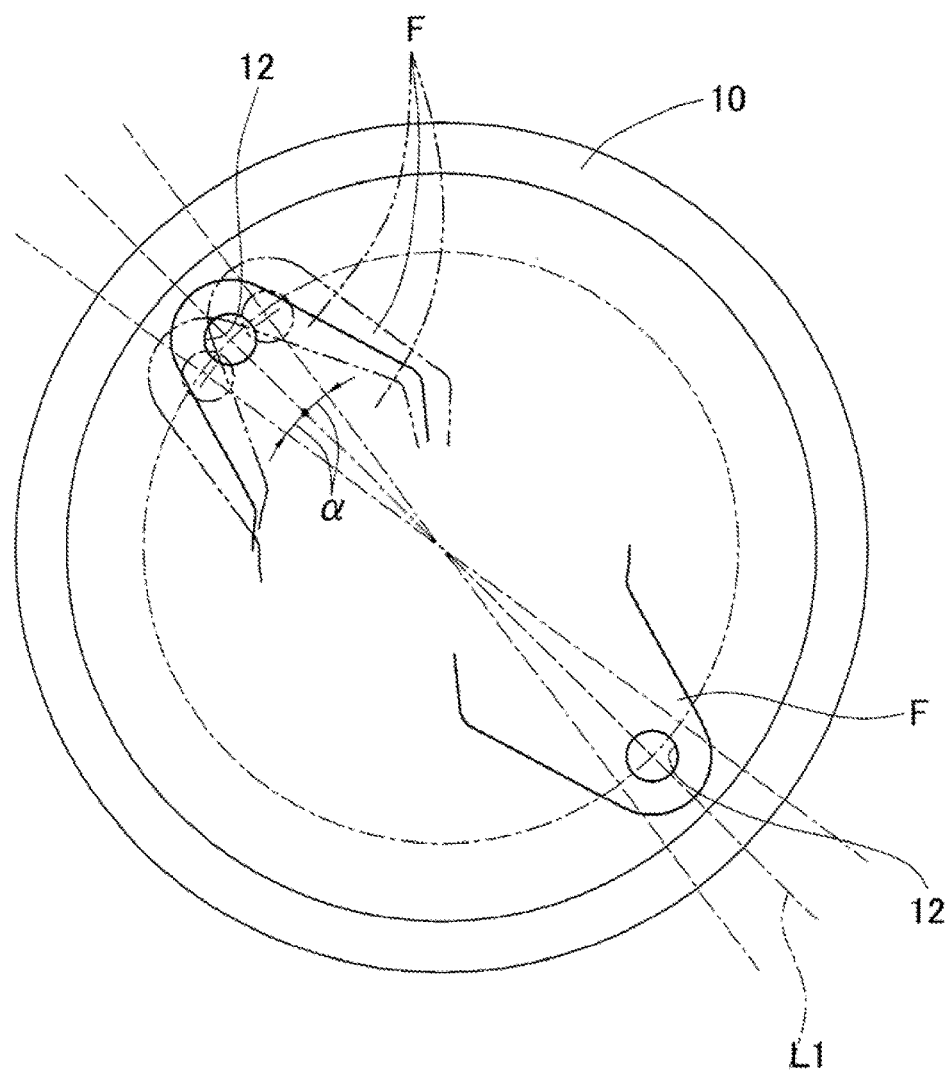

NEGATIVE PRESSURE-TYPE BOOSTER DEVICE

TECHNICAL FIELD

The present invention relates to a negative pressure-type booster device employed in a brake device for a vehicle. More specifically, the invention devises the shapes of reinforcement ribs disposed on front shells of booster shells to make it possible to cause the front shells having equal shapes to cope with a difference between installation pitches of tie-rod holes fastening master cylinders, a difference between attaching directions of the master cylinders, and the like.

BACKGROUND ART

The initially described negative pressure-type booster device includes a bulkhead member constituting a power piston in a booster shell. The bulkhead member is obtained by combining a pressure plate and a diaphragm, and the bulkhead member partitions the interior of the booster shell into a constant-pressure chamber and a variable-pressure chamber.

The constant-pressure chamber is connected to an intake manifold of an engine, and the variable-pressure chamber is connected to an atmospheric-air intake path. The power piston is configured such that a valve piston including a negative-pressure valve and an atmospheric-pressure valve which are disposed therein is attached to a central part of the bulkhead member.

In the negative pressure-type booster device, the negative-pressure valve is closed by a braking operation to cut a communication between the constant-pressure chamber and the variable-pressure chamber. Thereafter, the atmospheric-pressure valve opens to take atmospheric air into the variable-pressure chamber through the atmospheric-air intake path. In this manner, a pressure difference occurs between the constant-pressure chamber and the variable-pressure chamber, the pressure difference advances the power piston, and force amplified depending on braking operation force activates the master cylinder. Since the activation mechanism is well known, a detailed description thereof will be omitted.

The booster shell of the negative pressure-type booster device is configured by a combination of a front shell and a rear shell, and the master cylinder is fastened to the front shell by using two tie rods.

In the front shell, a through hole in which an input side of the master cylinder is inserted is formed at the center, and tie-rod holes through which the tie rods are inserted are formed around the through hole. The number of the tie-rod holes formed is two, and these two holes are disposed at respectively 180°-rotated positions with the through hole interposed therebetween.

The two tie-rod holes are also formed in the rear shell. In the rear shell, a bolt hole in which an attaching bolt is inserted is also additionally formed at a position turning from an installation point of each of the tie-rod holes at approximately 90 degrees in a circumferential direction.

An example of the booster shell obtained by combining the front shell and the rear shell in which the tie-rod holes are formed is described in, for example, the following Patent Literature 1. In a negative-pressure booster disclosed in the literature, reinforcement ribs are formed around the tie-rod holes in the front shell and the rear shell to reduce the thicknesses of the shells.

The reinforcement ribs, in each of the front shell and the rear shell, are obtained by combining a rib radially extending from the center of each of the shells, a circular rib disposed on a circle coaxial with the center of each of the shells, and a rib surrounding the opening of each of the tie-rod holes. The circular rib includes a plurality of ribs having different diameters and coaxially disposed.

CITATIONS LIST

Patent Literature

Patent Literature 1: Japanese Unexamined Patent Publication No. 2007-76437

SUMMARY OF INVENTION

Technical Problems

As installation pitches, i.e., distances from a shell center to the center of the tie-rod hole (simply referred to as installation pitches hereinafter) of the tie-rod holes formed in the booster shell of the negative pressure-type booster device, installation pitches of several types are used.

For example, in a 10.5-inch negative pressure-type booster device for passenger vehicle, a 72×72 pitch, an 80×60 pitch, or the like is used as the installation pitch.

In this manner, installation pitches of tie-rod holes are not standardized even in shells having equal sizes, and, as indicated by a solid line and a chain line in FIG. 5, some tie-rod holes have different installation angles $\alpha$. For this reason, the reinforcement ribs of the front shell are disposed at positions set such that distances from the centers of the tie-rod holes are proper in accordance with the installation pitches and the installation angles, respectively.

The negative pressure-type booster device has a pressure difference between the constant-pressure chamber and the outside in operation. In non-operation, the constant-pressure chamber communicates with the variable-pressure chamber to cause pressure differences between the constant-pressure chamber and the outside and between the variable-pressure chamber and the outside. The pressure differences push the front shell and the rear shell in an axial direction.

At this time, since the tie rods and the tie-rod holes formed in the front shell and the rear shell and the bolt holes formed in the rear shell are fixed to each other, stress is concentrated on the peripheries of the holes.

The stress is distributed to the peripheries of a total of four holes (two tie-rod holes and two bolt holes) disposed at an approximately 90° pitch in a circumferential direction in the rear shell without especially causing a problem. However, in the front shell, most of stress is loaded on the peripheries of two tie rod holes.

For this reason, when a distance from the center of the tie-rod hole to the reinforcement rib is not proper, the concentrated stress may disadvantageously deform the front shell.

In order to prevent the deformation, installation positions of the reinforcement ribs in the front shell are changed in accordance with differences of the installation pitches and the installation angles of the tie-rod holes. However, the method requires an increase in the types of shells and is not preferable in terms of productivity, cost, and the like.

Thus, the present invention aims to make it possible to cause the same front shells to fulfill a request that devises shapes of reinforcement ribs disposed on the front shells of booster shells of negative pressure-type booster devices in order to standardize the front shells and to vary installation pitches and installation angles of tie-rod holes.

Solutions to Problems

In order to solve the above problems, the present invention provides, as a result of making improvements, a negative pressure-type booster device including a booster shell obtained by combining a front shell and a rear shell. In this device, an interior of the booster shell is partitioned into a constant-pressure chamber and a variable-pressure chamber by a bulkhead member of a power piston, the front shell includes a reinforcement rib formed by bending the front shell and two tie-rod holes in which tie rods are inserted, the two tie-rod holes are disposed on a straight line extending in a radial direction through a center of the booster shell, and a master cylinder is fastened to the booster shell by the tie rods inserted into the tie-rod holes, the reinforcement rib of the front shell being formed along a virtual ellipse in which a center of the ellipse is located at a center of the front shell and a major axis of the ellipse is disposed on an axial line connecting a center of the tie-rod hole and the center of the front shell. The center of the tie-rod hole means a center of a hole whose installation pitch is maximum among the tie-rod holes with which the same front shell is to cope.

The virtual ellipse is preferably an ellipse obtained by drawing tie-rod holes having different installation pitches and different installation angles on a drawing showing an end face of the front shell and, with reference to an ellipse on which the center of each of the drawn tie-rod holes is placed, the ellipse being parallelly along an outer periphery of the reference ellipse.

The reinforcement rib disposed along the virtual ellipse may be a rib being continuous in a circumferential direction or a rib being discontinuous in the circumferential direction (discontinuous disposition).

In a configuration in which the reinforcement ribs are formed discontinuously in the circumferential direction, the reinforcement rib is disposed on the virtual ellipse at least near both the ends of the major axis of the virtual ellipse, and the reinforcement rib in another region is disposed on the virtual ellipse or at a position close to the virtual ellipse.

In the negative pressure-type booster device, an inside reinforcement rib is preferably formed in a region surrounded by the reinforcement rib.

The inside reinforcement rib is preferably disposed on an inside virtual ellipse which is set inside the virtual ellipse and in which the major axis of the ellipse is orthogonal to the major axis of the virtual ellipse at the center of the front shell.

Effects of Invention

In the negative pressure-type booster device, since the reinforcement rib has a shape along the virtual ellipse, when tie-rod holes having different installation pitches and different installation angles are to be formed, the reinforcement rib can be disposed such that a distance from the center of each of the tie-rod holes to the reinforcement rib can be properly kept.

Especially when the reinforcement rib is disposed along an ellipse similar to the reference ellipse and parallel with the reference ellipse, with respect to the tie-rod holes having different installation pitches and different installation angles, a distance from the center of each of the holes to the reinforcement rib can be kept constant, and a reinforcement effect can be stably exerted by the reinforcement rib.

In this manner, the front shells can be standardized on a request of making the installation pitches and the installation angle of the tie-rod holes different from each other, and effects such as a reduction in number of types of booster shells in which the thicknesses and weights of the shells are reduced by disposing reinforcement ribs, and improvement in productivity, a reduction in cost can be expected.

BRIEF DESCRIPTION OF DRAWINGS

FIG. 1 is a sectional view showing an example of a negative pressure-type booster device according to the present invention.

FIG. 2 is an end view of a front shell side showing the negative pressure-type booster device in FIG. 1 in a state in which a master cylinder is attached.

FIG. 3 is an enlarged end view showing a reinforcement rib installation part of a front shell in a state in which the master cylinder is removed.

FIG. 4 is an end view of a front shell side showing an example of a negative pressure-type booster device in which an attaching direction of the master cylinder is inclined in a direction opposing the direction in FIG. 2.

FIG. 5 is a diagram showing an example in which the installation pitches and the installation angles of the tie-rod holes are made different from each other, respectively.

DESCRIPTION OF EMBODIMENT

An embodiment of a negative pressure-type booster device according to the present invention will be described below with reference to FIGS. 1 to 4 of the accompanying drawings.

A negative pressure-type booster device 1 shown in FIG. 1 is configured by a combination of a booster shell 2, a power piston 3, an input rod 4, an output rod 5, a return spring 6 returning the power piston 3, two tie rods 7, and an attaching bolt 15 fixing the booster shell 2 to a vehicle body of an automobile in combination with the tie rods 7.

The booster shell 2 includes a front shell 2a and a rear shell 2b. The front shell 2a includes a suction port 14 connected to an intake manifold of a vehicle engine.

The tie rods 7 are disposed on a straight line extending in a radial direction through the center of the booster shell 2, and the tie rods 7 and the attaching bolt 15 engaged with the rear shell 2b are used as fastening tools to fix the booster shell 2 to a vehicle body.

The power piston 3 is configured by a combination of a bulkhead member 3a including a pressure plate Pp and a diaphragm Dp and a valve piston 3b including a negative-pressure valve Vv and an atmospheric-pressure valve Av therein, and the bulkhead member 3a of the power piston 3 partitions the interior of the booster shell 2 into a constant-pressure chamber 8 and a variable-pressure chamber 9.

The negative-pressure valve Vv is disposed on a path communicating the constant-pressure chamber 8 and the variable-pressure chamber 9 with each other to open/close the path. The atmospheric-pressure valve Av is disposed on a path connecting the variable-pressure chamber 9 to the outside to open/close the path.

The input rod 4 is inserted into the valve piston 3b. When a driver performs a braking operation to push the input rod 4 into the valve piston 3b, a valve body of the negative-pressure valve Vv is brought into contact with a valve sheet to close the negative-pressure valve Vv so as to cut communication between the constant-pressure chamber 8 and the variable-pressure chamber 9.

The input rod 4 is further pushed to separate a valve body of the atmospheric-pressure valve Av from a valve sheet, and the atmospheric-pressure valve Av opens to cause atmospheric air to flow into the variable-pressure chamber 9.

In this manner, a pressure difference occurs between the constant-pressure chamber 8 and the variable-pressure chamber 9, the power piston 3 which receives the pressure difference moves forward, and the forward force (force amplified depending on braking operation force) is transmitted to a master cylinder MC through the output rod 5 to actuate the master cylinder MC. The actuation mechanism is the same as that in a conventional negative pressure-type booster device.

The front shell 2a and the rear shell 2b constituting the booster shell 2 of the illustrated negative pressure-type booster device 1 have a reinforcement rib 10 formed by bending the shells therein, respectively.

The front shell 2a and the rear shell 2b have two tie-rod holes 12 in which the tie rods 7 are inserted.

An end-face shape of the front shell 2a employed in the illustrated negative pressure-type booster device 1 is shown in FIG. 2. The front shell 2a has a through hole 13 (see FIG. 1) in which the input side of the master cylinder MC is inserted at the center thereof.

The tie-rod holes 12 are disposed at respectively 180°-rotated positions with the through hole 13 interposed therebetween, the positions being on a straight line extending in a radial direction through the center of the booster shell 2.

Although not illustrated, the tie-rod holes of the rear shell 2b also have the same arrangement as that of the front shell 2a.

The reinforcement rib 10 of the front shell 2a, as shown in FIG. 3, is formed along a virtual ellipse BE. The virtual ellipse BE has an ellipse center located at a center O of the front shell 2a, and has a major axis on a straight line L1 connecting the center of the tie-rod hole 12 having the maximum installation pitch to the center O of the front shell.

The reinforcement rib 10 formed on the illustrated front shell 2a is discontinuously (intermittently) formed in a circumferential direction, reinforcement ribs (indicated by 10a for descriptive convenience) disposed on both end sides of the major axis of the virtual ellipse BE are separated from reinforcement ribs (similarly indicated by 10b) disposed on both end sides (other region) of a minor axis of the virtual ellipse BE.

The reinforcement rib 10a has a shape which is similar to that of the virtual ellipse BE and overlaps the virtual ellipse BE. The reinforcement rib 10b disposed in the other region is disposed in a region which is close to and along the virtual ellipse BE.

The illustrated virtual ellipse BE, as shown in FIG. 3, is an ellipse which is parallelly along the outer periphery of a reference ellipse CE which is obtained by drawing the tie-rod holes (tie-rod holes with which the same booster shell copes) 12 having different installation pitches and different installation angles on the end face view of the front shell 2a and at which the center of each of the drawn tie-rod holes 12 is disposed, and the ellipse is similar to the reference ellipse CE.

The reinforcement rib 10 may have a shape, the entire area of which is continuous in the circumferential direction. As shown in FIG. 2 and FIG. 3, in the reinforcement rib 10 formed discontinuously in the circumferential direction, at least the reinforcement rib 10a placed near both ends of the major axis of the virtual ellipse BE is disposed on the virtual ellipse BE.

The reinforcement rib 10b in the other region may be located at a position slightly separated from the virtual ellipse BE as long as the reinforcement rib 10b is close to the virtual ellipse BE, and the shape of the reinforcement rib 10b may also be a shape, as shown in FIG. 2 and FIG. 3, along a circle coaxial with the center of the front shell 2a.

In the illustrated front shell 2a, as a preferable configuration, an inside reinforcement rib 11 is formed in a region surrounded by the reinforcement rib 10.

An inside virtual ellipse $BE_1$ having a major axis of an ellipse on a straight line L2 orthogonal to a straight line L1 (more specifically, the major axis of the virtual ellipse BE) at the center O of the front shell 2a is set inside the virtual ellipse BE, and the inside reinforcement rib 11 is disposed on the inside virtual ellipse $BE_1$. In comparison with the front shell being free from the reinforcement rib 11, the reinforced front shell 2a can achieve reinforcements of the parts in the circumferential direction of the front shell 2a by the rib in a balanced manner, and has improved resistance of the front shell 2a to a pressure difference between the constant-pressure chamber and the outside.

FIG. 4 shows an application of the present invention to a negative pressure-type booster device in which an attaching direction (attaching direction of an attaching flange F) of the master cylinder MC is inclined in a direction different from that in FIG. 2.

Also in this configuration, the virtual ellipse BE having a center of the ellipse located at the center of the front shell 2a and a major axis on the straight line L1 connecting two tie-rod holes is set, and the reinforcement rib 10 is formed along the virtual ellipse BE to make it possible to properly keep, when tie-rod holes having different installation pitches and different installation angles are formed, a distance from the center of each of the tie-rod holes to the reinforcement rib 10.

As the attaching direction of the master cylinder, the direction in FIG. 2 in which the attaching flange F is inclined in a left-turn direction with reference to a vertical line passing through the center of the shell and a direction in FIG. 4 in which the attaching flange F is inclined in a right-turn direction are given. However, when the invention is applied, even in both the configurations, front shells of two types in which major axis directions of the virtual ellipses are different from each other can cope with the differences between the installation pitches and the installation angles of the tie-rod holes.

In the rear shell 2b, since the tie-rod hole and the bolt hole are alternatively disposed at an approximately 90° pitch in the circumferential direction, stress acting on the periphery of the tie-rod hole is smaller than that in the front shell. Thus, as the rear shell 2b, a rear shell in which a reinforcement rib is disposed on a circle coaxial with the center of the rear shell may be used.

REFERENCE SIGNS LIST

1: NEGATIVE PRESSURE-TYPE BOOSTER DEVICE
2: BOOSTER SHELL
2a: FRONT SHELL
2b: REAR SHELL
3: POWER PISTON
3a: BULKHEAD MEMBER
Pp: PRESSURE PLATE
Dp: DIAPHRAGM
3b: VALVE PISTON
Vv: NEGATIVE-PRESSURE VALVE
Av: ATMOSPHERIC-PRESSURE VALVE

4: INPUT ROD
5: OUTPUT ROD
6: RETURN SPRING
7: TIE ROD
8: CONSTANT-PRESSURE CHAMBER
9: VARIABLE-PRESSURE CHAMBER
10, 10a, 10b: REINFORCEMENT RIB
11: INSIDE REINFORCEMENT RIB
12: TIE-ROD HOLE
13: THROUGH HOLE
14: SUCTION PORT
15: ATTACHING BOLT
MC: MASTER CYLINDER
L1: STRAIGHT LINE CONNECTING CENTER OF TIE-ROD HOLE TO CENTER OF FRONT SHELL
L2: STRAIGHT LINE ORTHOGONAL TO STRAIGHT LINE L1 AT CENTER OF FRONT SHELL
BE: VIRTUAL ELLIPSE
CE: REFERENCE ELLIPSE
$BE_1$: INSIDE VIRTUAL ELLIPSE
O: CENTER OF FRONT SHELL

The invention claimed is:

1. A negative pressure-type booster device having a booster shell obtained by combining a front shell and a rear shell, an interior of the booster shell being partitioned into a constant-pressure chamber and a variable-pressure chamber by a bulkhead member of a power piston,
the front shell including a reinforcement rib formed by bending the front shell and two tie-rod holes in which tie rods are inserted, the two tie-rod holes being disposed on a straight line extending in a radial direction through a center of the front shell, and a master cylinder being fastened to the booster shell by the tie rods inserted into the tie-rod holes, wherein
the reinforcement rib of the front shell is formed along a virtual ellipse in which a center of the ellipse is located at a center of the front shell and a major axis of the ellipse is disposed on an axial line connecting a center of the tie-rod hole and the center of the front shell.

2. The negative pressure-type booster device according to claim 1, wherein an inside reinforcement rib is formed in a region surrounded by the reinforcement rib.

3. The negative pressure-type booster device according to claim 2, wherein the inside reinforcement rib is disposed on an inside virtual ellipse which is set inside the virtual ellipse and in which the major axis of the ellipse is orthogonal to the major axis of the virtual ellipse at the center of the front shell.

4. The negative pressure-type booster device according to claim 1, wherein the virtual ellipse is an ellipse obtained by drawing tie-rod holes having different installation pitches and different installation angles on a drawing showing an end face of the front shell and, with reference to an ellipse on which the center of each of the drawn tie-rod holes is placed, the ellipse being parallelly along an outer periphery of the reference ellipse.

5. The negative pressure-type booster device according to claim 1, wherein the reinforcement rib is a rib which is discontinuous in a circumferential direction.

6. The negative pressure-type booster device according to claim 1, wherein the reinforcement rib is a rib which is continuous in a circumferential direction.

* * * * *